April 15, 1930.  A. G. ANDERSON  1,755,157
SEPARABLE FASTENER UNIT
Filed May 12, 1928  2 Sheets-Sheet 1

Inventor:
Andrew G. Anderson
by Emery, Booth, Janney & Varney
Attys

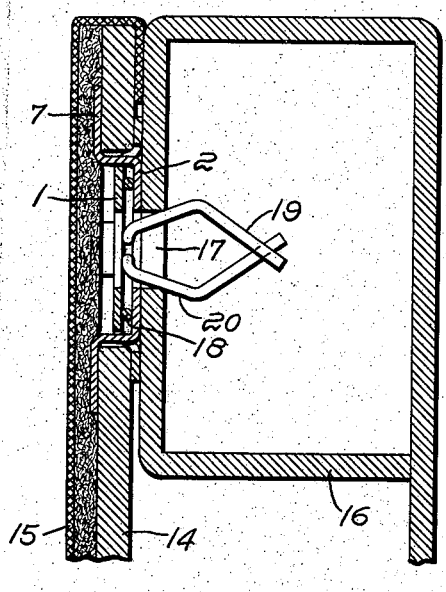
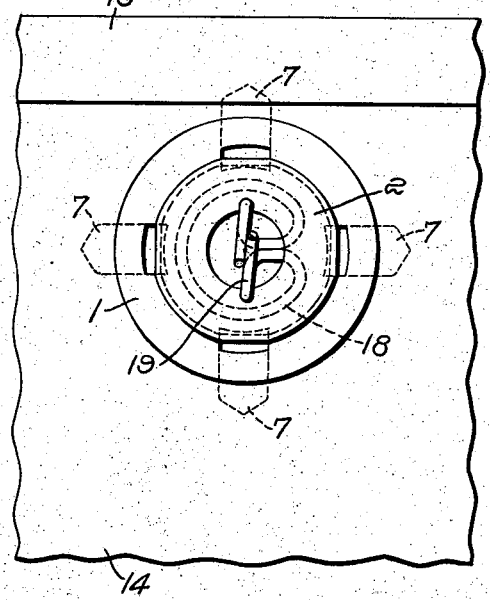
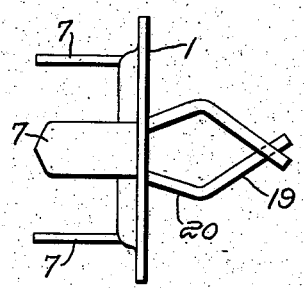
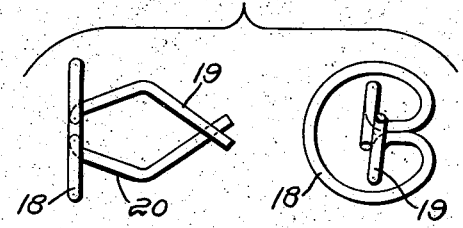

Patented Apr. 15, 1930

1,755,157

UNITED STATES PATENT OFFICE

ANDREW G. ANDERSON, OF WOLLASTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

SEPARABLE-FASTENER UNIT

Application filed May 12, 1928. Serial No. 277,235.

My invention aims to provide improvements in fasteners and more particularly snap fastener units of the shiftable stud type.

Referring to the embodiments of my invention, illustrated by the drawings:—

Fig. 7 is a section similar to that illustrated by Fig. 1, but showing a wire type stud member substituted for the pressed metal stud member illustrated by Figure 1;

Fig. 8 is an elevation view of the upholstered part viewed from the inner side thereof and showing the fastener unit illustrated in Fig. 7 as being attached thereto;

Fig. 9 is a side elevation of a fastener unit shown in Figs. 7 and 8; and

Fig. 10 illustrates a side elevation and a front elevation, respectively, of the wire stud member.

Referring to the embodiment of my invention as illustrated by Figs. 1 through 6 of the drawings, I have shown a shiftable fastening device for detachably securing together two parts of an installation. For the purpose of illustration only, I have shown (Fig. 1) the manner in which my improved fastening unit is used when securing an upholstered panel to a frame part.

Figure 1:
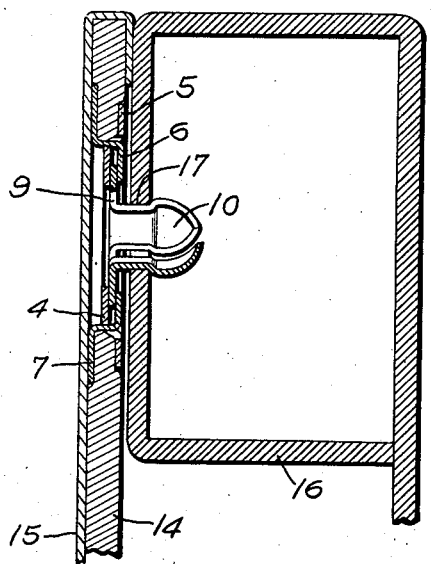
Figure 1 is a section taken through a portion of an installation showing the use of the fastener unit in attaching an upholstered part to a frame part.
Figure 6:
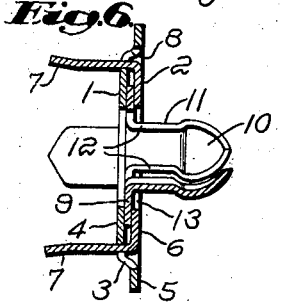

The fastening unit illustrated includes a casing and a stud member, as shown in Figs. 3 through 6. The casing is formed by two pressed metal parts 1 and 2. The part 1 has an annular wall 3, a flange 4 extending from one edge of the wall part way to the center of the casing and another flange 5 extending outwardly from the other edge of the wall 3, as best illustrated in Fig. 6. The part 2 has a ring-like portion 6 from the outer edge of which extend a number of prongs 7 passing through openings 8 in the part 1. These prongs 7 make a tight fit with the side walls of the openings 8 thereby holding the casing parts in assembly when they are attached at the point of manufacture. In designing the parts 1 and 2, I have proportioned them so that the ring-like part 2 will engage the wall 3 of the part 1 and be spaced from the flange 4 to provide a space for receiving the base 9 of the stud, as shown in Figs. 1 and 6. Thus, the ring-like portion 6 and flange 4 cooperate as spaced flanges of the casing to hold the stud in assembly with the casing.

The stud has the base 9 from which is pressed the socket-engaging head 10 and relatively long neck 11. If a resilient stud is desired the head and neck may be divided, as by the slits 12, to permit contraction and expansion of the head 10 when being engaged with or disengaged from suitable socket means.

As above described, the stud is assembled with the casing with its base 9 located in the space surrounded by the wall 4, and the head 10 and neck 11 extend outside of the casing through the aperture 13 in the ring-like portion 6 of the part 2. The diameter of the base 9 is somewhat smaller than the diameter of the space enclosed by the wall 3 and the neck 11 is smaller than the diameter of the aperture 13. Thus, I have made provision for substantial lateral shifting of the stud in any direction relative to the casing.

Figure 2:
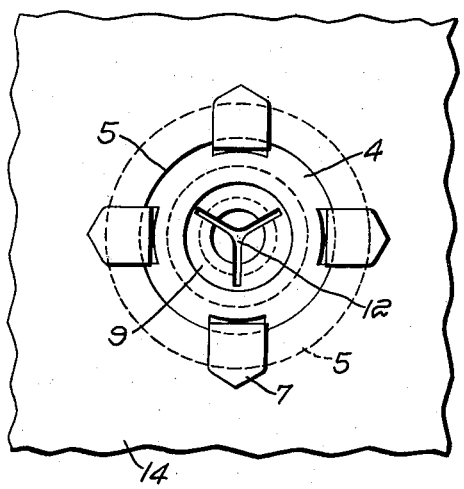
Fig. 2 is an elevation showing the manner in which the attaching prongs are bent to secure the fastener unit to a carrying medium.
Figure 3:
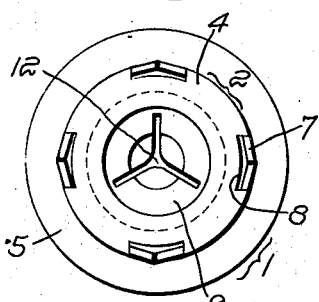
Figs. 3, 4, 5 and 6 illustrate, respectively, a rear elevation, a side elevation, a front elevation and a section of the fastener unit before attachment to a support.
Figure 4:
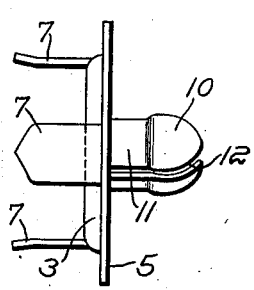
Figure 5:
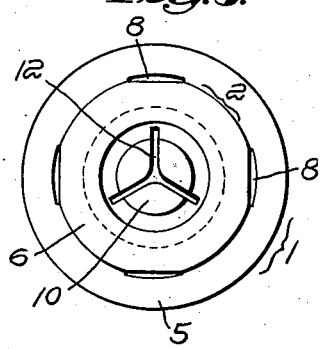

In attaching the stud unit above described to the backing 14 of an upholstery panel, I first provide a hole in the backing into which the wall 3 of the casing may fit, as shown in Figs. 1 and 2, so that the flange 5 may rest against one face of the backing. Then the prongs 7 are clenched outwardly and downwardly against the opposite face of the backing 14 so that when the installation of the fastener unit is complete there are no substantial projections, except the head 10 and neck 11 of the stud. After the stud units are attached, the covering material 15 may be applied in the usual manner.

The frame part 16, to which the upholstered part is to be attached by the fastener units, is indicated as being formed of sheet metal which has an aperture 17 provided therein. This aperture 17 provides the socket means with which a stud cooperates.

A panel carrying fastener units of the type above described may be readily applied to its frame by merely pressing the heads of the studs through apertures in the frame. If the apertures 17 and stud heads 10 do not align it is only necessary to shift the studs laterally in their casings to secure proper alignment and attachment of the panel in proper relation to the frame.

Referring now to my invention as illustrated in Figs. 7 through 10, I have shown a fastener unit which is substantially the same in all respects with that illustrated and described in connection with Figs. 1 through 6, except the stud element. In this instance, I have provided a stud element which is formed from a single piece of wire. It has a base portion 18 from which extend the ends of the wire bent to provide a head 19 and a relatively long tapered neck 20. For all practical purposes this fastener unit may be used with the same results as the device described in connection with Figs. 1 through 6.

Fastener devices of the above described type are particularly useful in upholstery installations and the like, because the upholstered part is reduced to a minimum of thickness by locating the casing part of the unit between the faces of the backing. The devices are simple, durable and easy to assemble.

The flange 5 of the casing part is preferably made continuous, so that the fastener units may be used in automatic fastener attaching machines. While a number of ears may serve the purpose of attachment of the device to a carrying medium, it is more difficult to feed them and, therefore, I consider it as a part of my invention to provide a casing which has a continuous flange 5 in addition to the other means already described.

While I have illustrated and described two embodiments of my invention, I do not wish to be limited thereby as the scope of my invention is best defined by the following claims.

Claims:

1. A fastener unit comprising, in combination, a casting having an annular wall, fastener element holding means provided as a part of said casing and extending inwardly with relation to said wall to provide a space surrounded by said wall, a fastener element having a base located in the space between said fastener element holding means, means providing a continuous flange extending outwardly from said wall and attaching means extending from one of the fastener element holding means through and beyond the other part of the casing thereby to cooperate with said continuous flange for securing said unit to a support.

2. A fastener unit comprising, in combination, a casing having an annular wall, fastener element holding means provided as a part of said casing and extending inwardly with relation to said wall to provide a space surrounded by said wall, a fastener element having a base located in the space between said fastener element holding means, said base being of smaller diameter than the diameter of the space enclosed by said annular wall thereby to permit lateral shifting of said fastener element relative to said casing, a socket-engaging portion extending from said base and presenting a head and neck portion outside of said casing, means providing a continuous flange extending outwardly from said wall and attaching means extending from one of the fastener element holding means through and beyond the other part of the casing thereby to cooperate with said continuous flange for securing said unit to a support.

3. A fastener unit comprising, in combination, a casing having an annular wall, fastener element holding means provided as a part of said casing and extending inwardly with relation to said wall to provide a space surrounded by said wall, a fastener element having a base located in the space between said fastener element holding means, said base being of smaller diameter than the diameter of the space enclosed by said annular wall thereby to permit lateral shifting of said fastener element relative to said casing, a socket-engaging portion extending from said base and presenting a head and neck portion outside of said casing, said base portion and said socket-engaging portion being formed from wire, means providing a continuous flange extending outwardly from said wall and attaching means associated with said casing to cooperate with said continuous flange for securing said unit to a support.

4. In a fastener unit, a casing formed from two parts secured together, one of said parts having an annular wall portion, a flange portion extending inwardly from one edge of said wall portion, a second flange portion extending outwardly from said wall portion, the other of said parts having a flange portion adapted to cooperate with said first mentioned flange portion to hold a fastener element in shiftable assembled relation with the casing and a number of attaching prongs extending through slots in said first mentioned flange portion and holding the parts of the casing together.

5. A fastener unit comprising, in combination, a casing having an annular wall, fastener element holding means provided as a part of said casing and extending inwardly with relation to said wall to provide a space surrounded by said wall, a wire stud fastener element having a base located in the space between said fastener element holding means, means extending outwardly from said wall and attaching means associated with said casing to cooperate with said outwardly extending means for securing said unit to a support.

In testimony whereof, I have signed my name to this specification.

ANDREW G. ANDERSON.